J. C. WELLS.
OPHTHALMIC MOUNTING.
APPLICATION FILED APR. 1, 1918.
1,332,242. Patented Mar. 2, 1920.
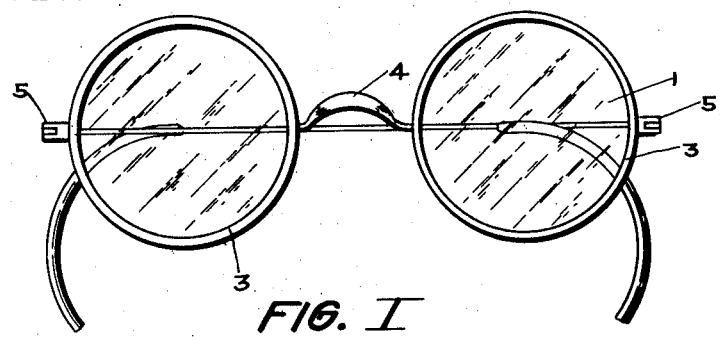
FIG. I
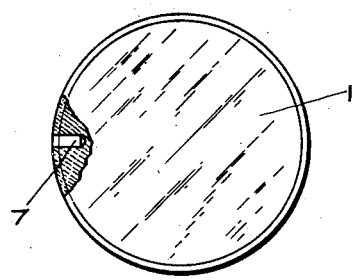
FIG. II
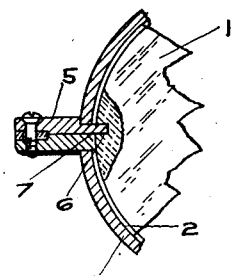
FIG. III
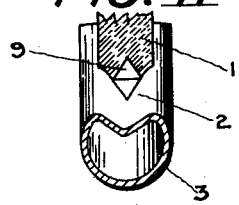
FIG. IV
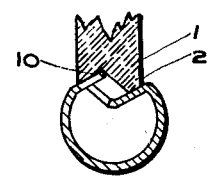
FIG. V
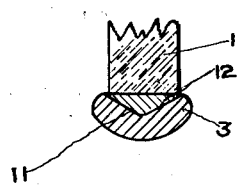
FIG. VI
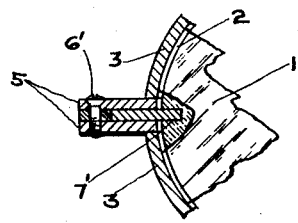
FIG. VII
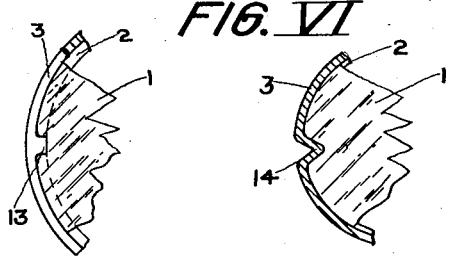
FIG. VIII  FIG. IX
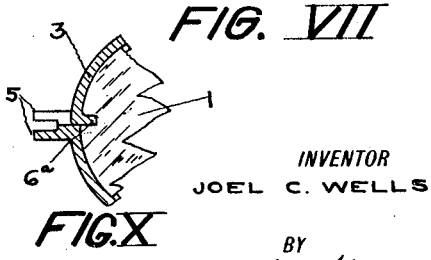
FIG. X
INVENTOR
JOEL C. WELLS
BY
H. H. Styll & H. K. Parson
ATTORNEYS

UNITED STATES PATENT OFFICE.

JOEL C. WELLS, OF SOUTHBRIDGE, MASSACHUSETTS.

OPHTHALMIC MOUNTING.

1,332,242.　　　　　Specification of Letters Patent.　　Patented Mar. 2, 1920.

Application filed April 1, 1918. Serial No. 225,942.

*To all whom it may concern:*

Be it known that I, JOEL C. WELLS, a citizen of the United States, residing at Southbridge, in the county of Worcester and State of Massachusetts, have invented certain new and useful Improvements in Ophthalmic Mountings; of which the following is a specification.

This invention relates to new and useful improvements in ophthalmic mountings and more particularly to lens frame construction, the main object of the present invention being the provision of means for preventing the rotation of lenses within their frames.

Another object of the present invention is the provision of lens frames having means carried thereby for preventing the rotation of the lenses therein, said means being placed in such a position as to render them entirely invisible.

A further object of the present invention is the provision of a lens frame and means carried thereby which will not only prevent the rotation of the lenses within the frame but will securely hold them against displacement therein until the end pieces, which connect the ends of the frame, are detached.

With the above and other objects in view the invention consists in the novel features of construction and the combination and arrangement of parts hereinafter more fully set forth, pointed out in the claims, and shown in the accompanying drawings, in which Figure I is a front elevation of a frame and lenses therefor constructed in accordance with my invention:

Fig. II is a face view of one of the lenses:

Fig. III is a transverse sectional view illustrating the manner of engaging the lens to prevent rotation of the same within the frame:

Fig. IV is a similar view illustrating another form of the invention:

Fig. V is another transverse sectional view illustrating still another form of the invention:

Fig. VI is a similar view illustrating still another form of the invention: and

Fig. VII is a detailed side elevation partly in section illustrating in detail that form of the invention shown in Fig. V.

Figs. VIII, IX, and X are detailed elevations, parts thereof being broken away and in section illustrating various modified forms of my invention.

Referring now more particularly to the drawings in which the various reference characters designate the several parts throughout the views, the numeral 1 indicates the lenses which are herein shown as being circular in form and as having their edges beveled for engagement with the annular grooves 2 of the frames 3. It will be understood that in the construction of this frame, the same may be formed of a composition, or any suitable metal desired, and includes the lens portions or frames, the connecting bridge 4, and the laterally projecting end pieces 5 which are detachably connected together to securely retain the lenses within the frame. It will be understood that in forming the lens portions or frames, they may be of a solid material or hollow as clearly illustrated in the accompanying drawings.

It will be noted that the frames are provided adjacent one end thereof with the inwardly projecting lugs 6 adapted to engage within suitable recesses 7 formed within the edges of the lenses 1. It will be apparent, however, that these lugs 6 can be formed on the ends of either the solid frame structure or on the hollow structure. After the end pieces 5 have been securely fastened together, the lenses will not only be prevented from rotating but at the same time will be held securely against removal from the frames. It is to be understood that these lugs 6 may be integrally formed with the frames 3 or they may consist of a plate 7' disposed between the ends of the frame and having its inner end extending inwardly into the frame and engage with the lenses in a manner similar to the lug 6.

In Figs. IV and V I have illustrated a frame portion formed of a hollow metallic shell and provided with a V-shaped groove and further provided with inwardly projecting lugs which in Fig. IV are struck up from the center of the groove to form the tapering lug 9 which engages within a similar shaped recess within the lens 1, said lug being securely retained in place by the fastening of the end members 5. In Fig. V it will be noted that the lug 10 is struck up from the side wall of the groove in the frame, of substantially the same shape as the lug 9 only disposed at right angles to the same. This form of the invention is particularly adapted for the hollow metallic frames but should it be desired to use the same with a solid frame, the lugs 9 and 10 can be integrally formed or welded into the grooves in the frame. In Fig. VI I have illustrated another form of the invention wherein the construction of the frame is solid as illustrated in cross section and provided with transversely disposed pyramidal-shaped lugs 11 adapted for engagement with a similar shaped recess 12 formed in each of the lenses and which may be used in place of any of the forms of the invention heretofore disclosed. It will be noted that the lug 11 extends upwardly from the groove in the frame in the frame until its upper face is substantially flush with the top edge of the walls of the groove so that this particular fastening means is not exposed to view when looking through the lenses.

In Fig. VII I have illustrated that form of the invention wherein a separate plate 7' is disposed between the end pieces 5 and the inner end thereof extends inwardly into the notch or recess in the edge of the lens and is securely retained in position by means of the screw member 6' which fastens the end pieces 5 together.

In Fig. VIII I have disclosed that form of the invention which is preferably solid in cross section and having formed therein an outstanding lug 13 which is brought out during the grooving operation of the main frame member 3. In grooving the frame member 3 the roller can be provided with a recess, which will leave the lug 13 extending outwardly from the inner face of the frame after the groover has passed therethrough. This lug 13 will fit into a similar shaped recess within the lens 1 and the operation will be substantially the same as the forms above set forth. In Fig. IX I have illustrated still another form of the invention wherein the lug 14 is pressed inwardly into the entire metallic form of the frame and engages within a similar recess in the lens. This form of lug 14 is preferably used where the lens frame is substantially light in weight and does not contain a great amount of material as will be noticed from the illustration in the accompanying drawings. In Fig. X I have illustrated a form of invention wherein the lug 6ª is integrally formed with one end of the lens frame and projects inwardly into the recess or notch in the lens 1 and operates substantially the same as the illustration in Figs. III and VII. In Fig. X I have illustrated a construction wherein a lug 6ª is formed at one end of the frame and projects inwardly for engagement within the notch in the lens, and as illustrated is disposed in alinement with one of the temple end pieces and rests upon the opposite end of the frame. Thus, when the temple end pieces are secured together, the two ends of the frame will be brought tightly together, the lug 6ª projecting inwardly into the lens frame.

It will be apparent from the foregoing that any one of the above set forth modifications of my invention may be used in securely retaining the lenses against rotation within the frames. The manner of applying the frame to the lenses so that the retaining members are disposed within their respective recesses is obvious from the foregoing description, and it will be understood that the frames 3 may be formed either of a composition such as zylonite or the like or may be constructed of metal or any suitable material. It will be apparent that after the frames have once been clamped in position upon the lenses, the securing members, in a number of the modifications, are entirely invisible as they do not project beyond the edges of the groove which is formed upon the interior of the frames 3.

I claim:

1. An ophthalmic mounting including a grooved lens receiving member having a lens locking portion, said lens locking portion being in the form of a projection interrupting the groove and being formed from the lens receiving member through displacement of the material thereof.

2. In an ophthalmic mounting circular lens rims including tubular portions, and tongues struck outwardly from the tubular portions for engagement with the lenses.

3. In an ophthalmic mounting, circular lens rims including tubular portions having grooves to receive the lenses and tongues struck outwardly from the tubular portions and arranged within the grooves for engagement with the lenses.

4. An ophthalmic mounting including a grooved lens receiving member having a lens locking portion, said lens locking portion being in the form of a tongue cut from the adjacent rim portion and inwardly deflected to engage a notch in a lens.

5. In an ophthalmic mounting, circular lens rims including tubular portions, yielding tongues struck outwardly from the tubular portions for engagement with the lenses.

In testimony whereof I have affixed my signature, in presence of two witnesses.

JOEL C. WELLS.

Witnesses:
ARTHUR S. CANN,
H. E. COLEMAN.